United States Patent
Wang et al.

(10) Patent No.: US 11,586,604 B2
(45) Date of Patent: Feb. 21, 2023

(54) IN-MEMORY DATA STRUCTURE FOR DATA ACCESS

(71) Applicant: INTERNATIONAL BUSINESS MACHINES CORPORATION, Armonk, NY (US)

(72) Inventors: Xiaobo Wang, Haidian District (CN); Shuo Li, Beijing (CN); Sheng Yan Sun, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/919,272

(22) Filed: Jul. 2, 2020

(65) Prior Publication Data
US 2022/0004531 A1    Jan. 6, 2022

(51) Int. Cl.
*G06F 16/22*    (2019.01)
*G06F 16/23*    (2019.01)

(52) U.S. Cl.
CPC ...... *G06F 16/2282* (2019.01); *G06F 16/2379* (2019.01)

(58) Field of Classification Search
CPC .................... G06F 16/2282; G06F 16/2379
See application file for complete search history.

(56) References Cited

U.S. PATENT DOCUMENTS

| | | | | |
|---|---|---|---|---|
| 8,392,403 B2 * | 3/2013 | Yu | ........................ | G06F 16/2471 707/718 |
| 8,495,320 B1 * | 7/2013 | Sheredy | .............. | G11C 11/5628 711/162 |
| 8,868,510 B2 | 10/2014 | Gurajada | | |
| 8,892,558 B2 | 11/2014 | Barsness | | |
| 9,251,214 B2 | 2/2016 | Diaconu | | |
| 9,576,013 B2 * | 2/2017 | Legler | ................. | G06F 16/2282 |
| 9,710,511 B2 * | 7/2017 | Wright | ...................... | G06F 8/41 |
| 9,734,221 B2 * | 8/2017 | Sarferaz | ................ | G06F 16/252 |
| 2007/0239797 A1 | 10/2007 | Cattell | | |
| 2008/0046487 A1 * | 2/2008 | Kamada | .................. | G06F 16/27 |
| 2008/0133456 A1 * | 6/2008 | Richards | ............... | G06F 16/217 |

(Continued)

OTHER PUBLICATIONS

Author Unknown, "A System of Reducing Down Time in a Cached In-Memory Database Environment Using Checkpointing Mechanism," ip.com, Apr. 14, 2009, ip.com No. IPCOM000181835D, pp. 1-4.

(Continued)

*Primary Examiner* — Miranda Le
(74) *Attorney, Agent, or Firm* — Jordan T. Schiller

(57) ABSTRACT

Embodiments of the present disclosure relate to a method, system, and computer program product for generating one or more in-memory data structures for data access. According to the method, target data associated with a database is identified. Further, the method determines at least one data structure for the target data based on at least one access pattern of the target data in a plurality of historical queries against the database, wherein the target data is accessed in execution of the plurality of historical queries. The method further implements the at least one data structure in a memory to store the target data. The at least one data structure is used for further access to the target data in execution of a further query against the database.

12 Claims, 7 Drawing Sheets

(56) References Cited

U.S. PATENT DOCUMENTS

| | | | |
|---|---|---|---|
| 2009/0300269 A1* | 12/2009 | Radke | G06F 12/0246 |
| | | | 711/E12.008 |
| 2013/0262380 A1* | 10/2013 | Matsuda | H04L 41/024 |
| | | | 707/625 |
| 2016/0034214 A1* | 2/2016 | Kamp | G06F 11/2058 |
| | | | 711/114 |
| 2016/0350347 A1* | 12/2016 | Das | G06F 12/023 |
| 2016/0350371 A1* | 12/2016 | Das | G06F 12/023 |
| 2017/0124151 A1 | 5/2017 | Ji | |

OTHER PUBLICATIONS

Mell et al., "The NIST Definition of Cloud Computing", National Institute of Standards and Technology, Special Publication 800-145, Sep. 2011, 7 pages.

* cited by examiner

IN-MEMORY DATA STRUCTURE FOR DATA ACCESS

BACKGROUND

The present disclosure generally relates to database query techniques and more particularly, to a method, system, and computer program product for implementing one or more in-memory data structures for data access in execution of queries against a database.

Databases are computerized information storage and retrieval systems. The most prevalent type of database is the relational database, a tabular database in which data is defined so that it can be reorganized and accessed in a number of different ways. Another type of database is a distributed database that can be dispersed or replicated among different points in a network. Regardless of the particular architecture, a requesting entity (e.g., an application or a client system) demands access to a specified database by issuing a query. The query may be made in a high-level query language such as the Structured Query Language (SQL) in the case of a relational database. Queries are executed to select, insert, update, find out the location of data in a database, and so forth. Queries and, consequently, query workload can consume significant system resources, particularly processor resources. The performance of query execution is critical in the database system.

SUMMARY

According to one embodiment of the present disclosure, there is provided a computer-implemented method. According to the method, target data associated with a database is identified. At least one data structure for the target data based on at least one access pattern of the target data in a plurality of historical queries against the database. The target data are accessed in execution of the plurality of historical queries. At least one data structure is implemented in a memory to store the target data. The at least one data structure is used for further access to the target data in execution of a further query against the database.

According to a further embodiment of the present disclosure, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
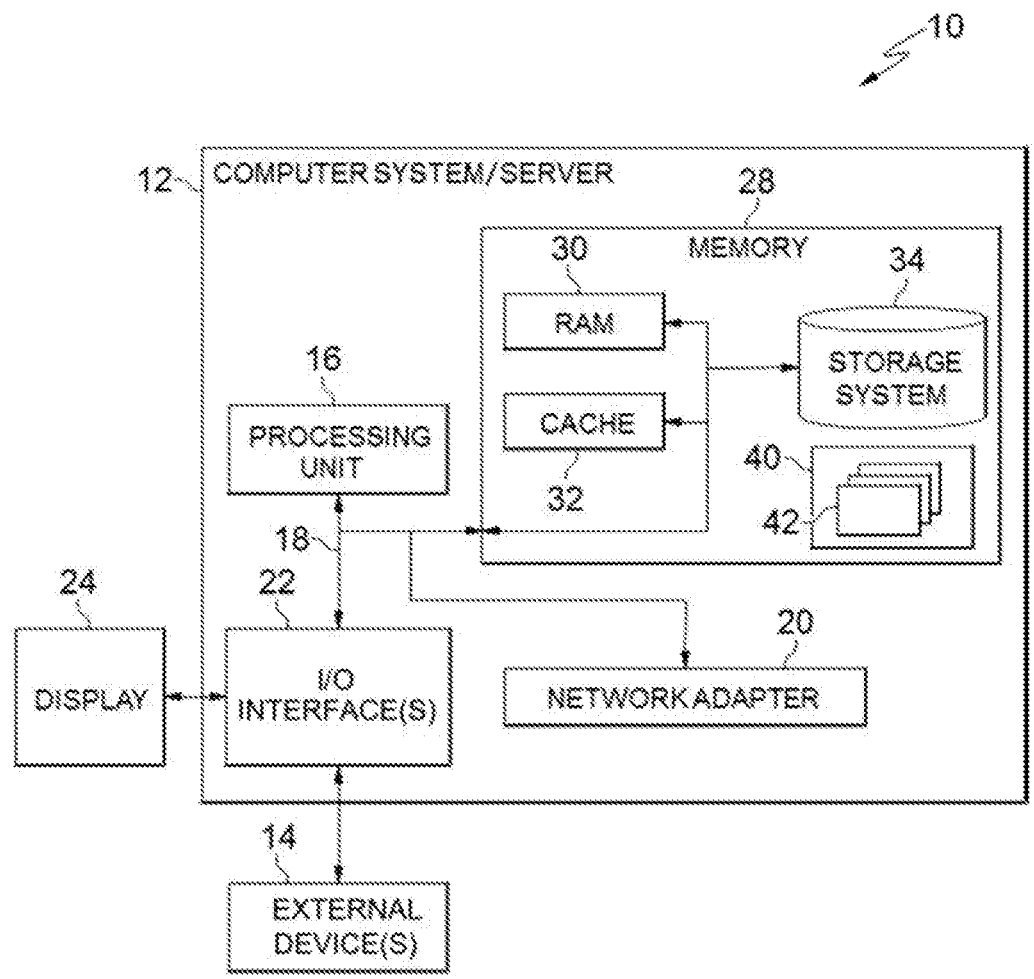
FIG. 1 depicts a cloud computing node, in accordance with embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
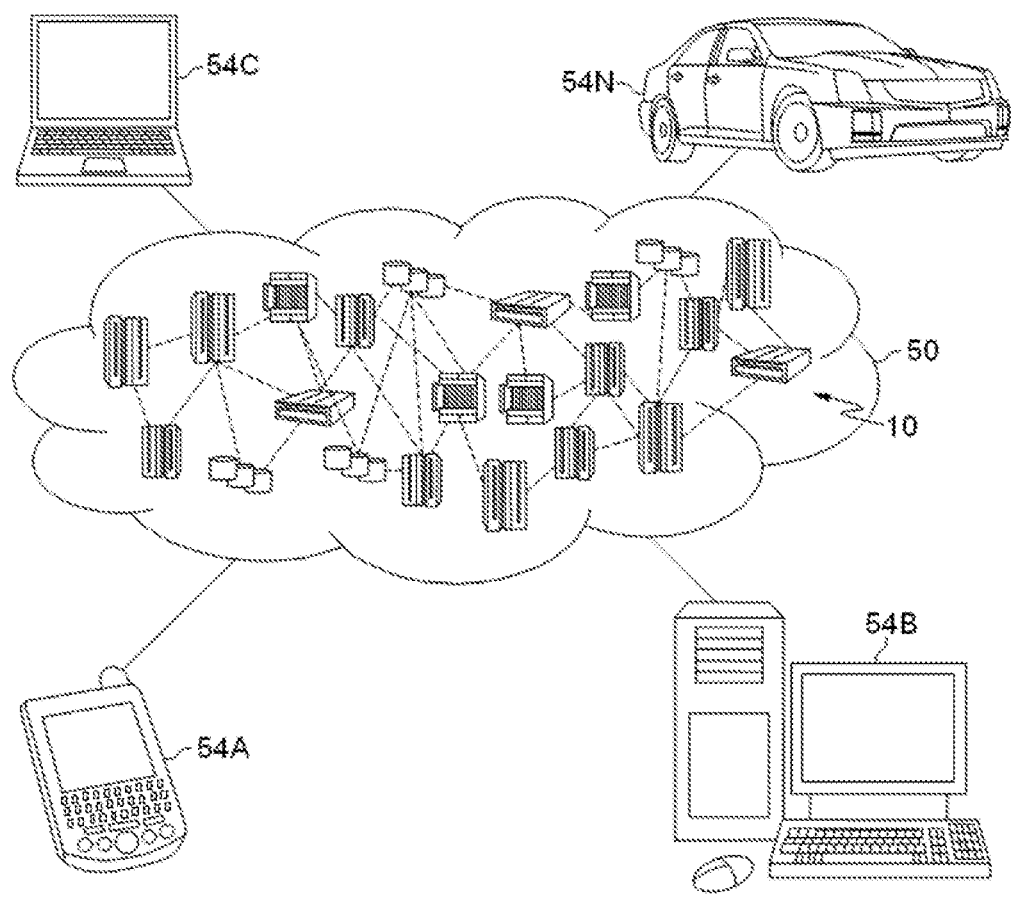
FIG. 2 depicts a cloud computing environment, in accordance with some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
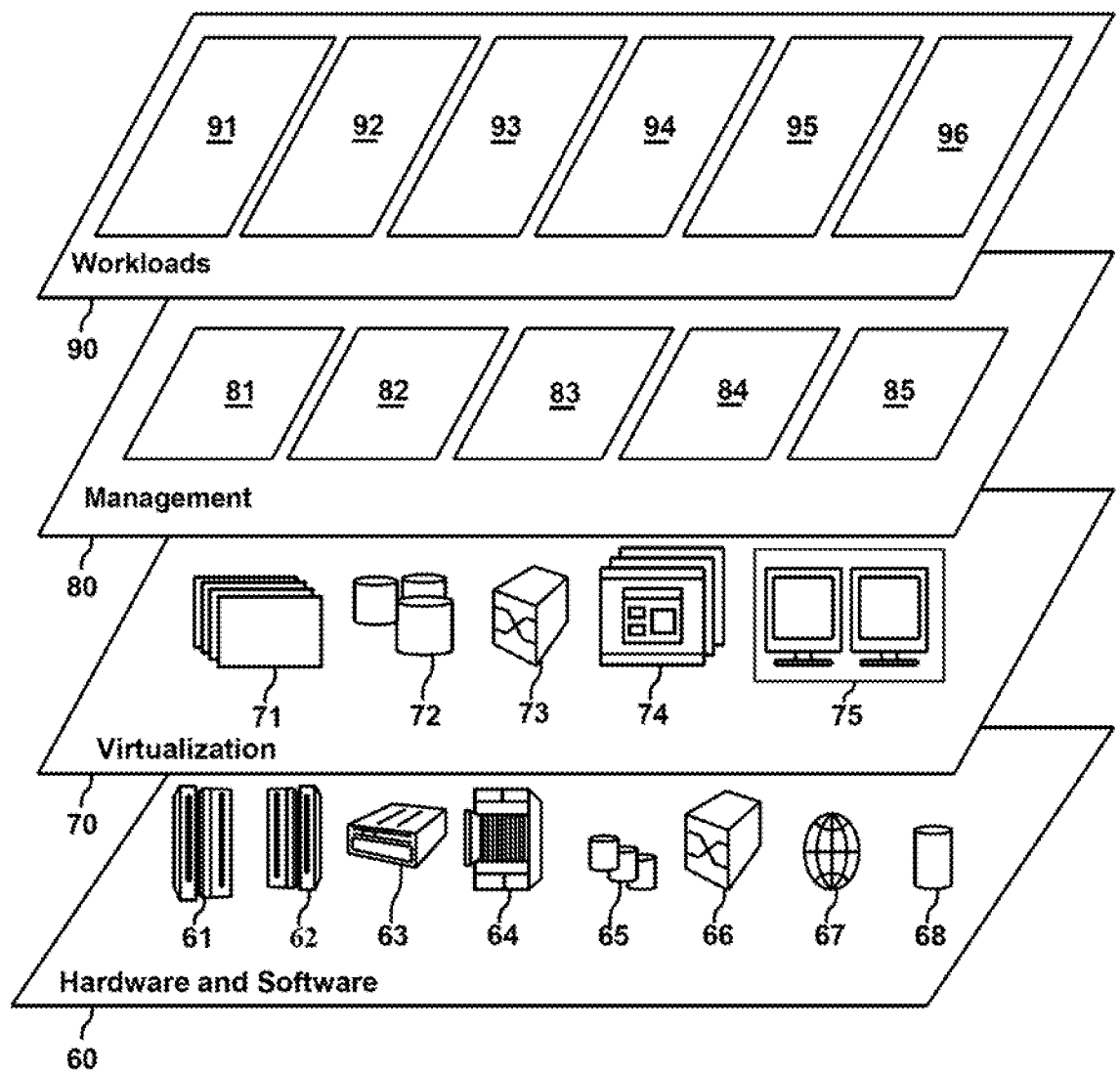
FIG. 3 depicts abstraction model layers, in accordance with some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database query management 96. The functionalities of database query management 96 will be described in the following embodiment of the present disclosure.

Figure 4:
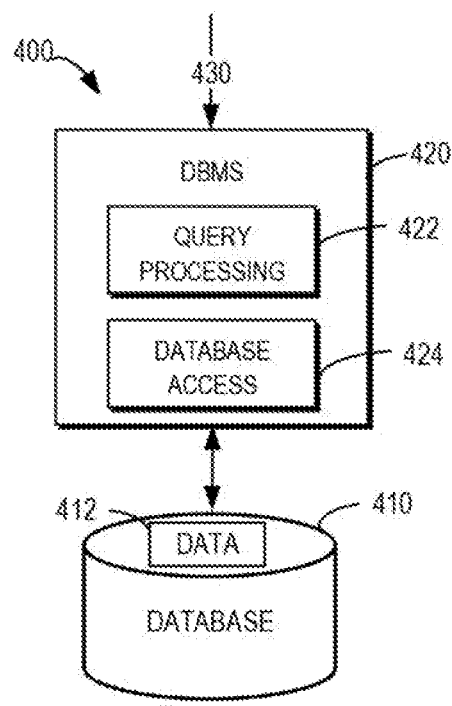
FIG. 4 depicts a block diagram of a database environment, in accordance with some embodiments of the present disclosure.

FIG. 4 illustrates a block diagram of a database environment 400. In the environment 400, a database 410 is used to store data 412 thereon which may come from various applications. Typically, the database 410 may build on massive storage devices. The databases 410 may be any suitable type of databases, including a relational database or non-relational database.

A database management system (DBMS) 420 is configured to manage the database 410. In some embodiments, the DBMS 420 may be implemented by computer system/server 12 of FIG. 1 or by multiple computer systems/servers in a distributed manner. In particular, the DBMS 420 supports processing of queries against the database 410.

In order to access, retrieve, and process the stored data 412 in the database 410, a query 430 is generated, automatically or manually, in accordance with the application program interface protocol for the database. The term "query" refers to a set of commands for retrieving data from a stored database. In the case of a relational database, the standard protocol is the structured query language (SQL), and thus the query 430 is a SQL query. SQL is used for interactive queries to access the data 412 in the database 410, in order to select, insert, update, find out the location of data in a database, and so forth.

The DBMS 420 receives and processes the query 430 in order to execute it. To execute the query 430, a query processing service 422 in the DBMS 420 processes the query 430 by parsing statements in the query 430, and generates an execution plan for the query 430. The execution of the query 430 generally requires access certain data in the database 410 for operation. The query processing service 422 invokes a database access service 424 to access the data in the database 410. As used, accessing data refers to reading data to and/or writing data from a database or a storage device.

Figure 5:
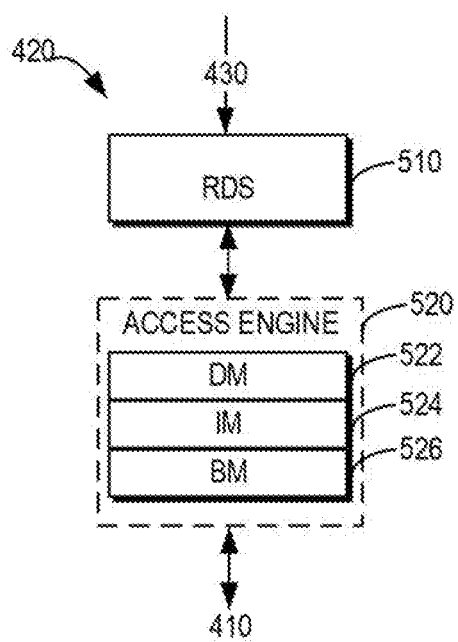
FIG. 5 depicts a block diagram of example architecture of a database management system of FIG. 4, in accordance with some embodiments of the present disclosure.

It would be appreciated that the query processing service 422 and the database access service 424 are illustratively depicted in FIG. 4. The DBMS 420 can be configured with any suitable architecture to support execution of queries against the database 410. FIG. 5 illustrates example architecture of the DBMS 420 in the case of a relational database. As illustrated, among others, the DBMS 420 comprises a relational data service (RDS) 510 configured to parse the query 430, and an underlying access engine 520 operable to access data required by the query 430 from the database 410.

The access engine 520 includes a data manger (DM) 522 for managing the data access, an index manager (IM) 524 for indexing the data in units of pages with keys, and a buffer manager (BM) 526 for searching data pages. The RDS 510, DM 522, IM 524, and BM 524 interact and negotiate with each other to complement the execution of the query 420.

To access certain data stored in the database 410, an example code path performed within the access engine 520 includes the following steps. The DM 522 calls the IM 524 for a record identifier (RID) of data recorded in the database 410. In response to the call from the DM 522, the IM 524 first calls the BM 526 for an index page. The BM 526 then searches for the index page and returns it to the IM 524. The IM 524 searches for a key within this index page and finds the RID for the DM 522. The DM 522 then sends the RID to the BM 526 in order to retrieve a data page corresponding to the RID (assuming that the data 412 are stored in the database 410 in units of page). The BM 526 searches the corresponding data page from the database 410 and returns it to the DM 522. The DM 522 searches the data required by the query 430 within the data page and returns the required data to the RDS 510.

It would be appreciated that the example of the DBMS 420 illustrated in FIG. 5 is provided for the purpose of illustration only without suggesting any limitation. In some embodiments, dual query processing engines may be included in the DBMS 420. In some embodiments, the DBMS 420 may comprise one or more different components or different processing architecture to process queries against the database 410.

Generally, queries and, consequently, query workload can consume significant system resources including processor resources as data are to be accessed from the database. For example, in a relational database, data are organized into formally-defined database tables consisting of rows and columns, each row or column comprising one or more data items. A query may require fetching one required row from the database. Usually the data access process may have to access a whole data page and searches for the required row from the data page. As a result, more time and processor resources are required to transfer, convert, process and filter the required data. Further, in order to support query optimization and efficient and reliable database management, the DBMS is composed of multiple components which are operable to interact with each other to fetch data from the database. Therefore, the DBMS often requires tremendous resources for data access in execution of the queries.

In order to improve the query performance, some existing solutions is to isolate database read and write operations, that is, employing different server nodes to perform the read operations and write operations. However, the distribution of the read and write operations may require massive log transitions to guarantee the data updates visible to all the server nodes in order to avoid error access. Moreover, data communication among nodes may introduce unnecessary data latency and security issues.

Therefore, there is a need for effective data access in a data management system for optimizing execution of queries against one or more databases.

According to example embodiments of the present disclosure, there is a proposed solution for effective data access. In this solution, target data that is to be accessed in execution of historical queries against a database is identified and stored in one or more data structures in a memory. Such a data structure in the memory is referred to as an in-memory data structure. The one or more in-memory data structures are determined based on historical queries against the databases. More specifically, the one or more in-memory data structures are determined by learning one or more access patterns of the target data from the execution of the historical queries. In this way, the in-memory data structure(s) are suitable for supporting efficient access to the target data in execution of further queries against the database.

Through this solution, instead of accessing data from the database, the access to the target data can be accelerated due to the fast access performance provided by the memory. Accordingly, the system resources including the processor resources required for database access can be significantly reduced, and the overall query execution performance is improved.

Other advantages of the present disclosure will be described with reference to the example embodiments and the accompanying drawings below. It is noted that some embodiments described herein refer to a relational database and SQL. However, it would be appreciated that the references to the relational database and SQL are included in the present disclosure for the purpose of illustration only. The present disclosure is not limited to the relational database and SQL but is applicable for any other types of database and query languages, such as non-relational database and the unstructured query language.

Figure 6:
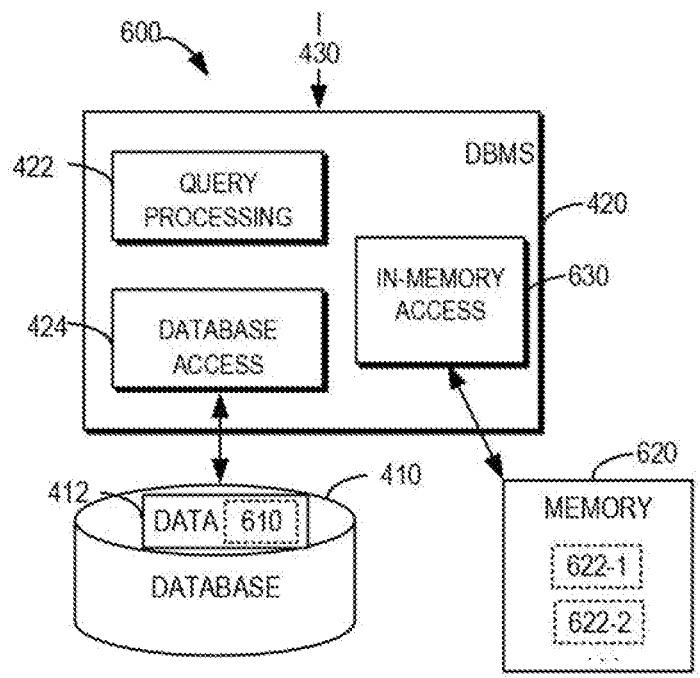
FIG. 6 depicts a block diagram of an example environment in which some embodiments of the present disclosure are implemented.

Reference is now made to FIG. 6, which illustrates an example environment in which some embodiments of the present disclosure are implemented. For the purpose of illustration, the environment of FIG. 6 is evolved from the general environment 400 in FIG. 4. Thus, the general arrangement of the environment 400 is similar to that shown FIG. 4.

In the embodiments of the present disclosure, the DBMS 420 is configured to implement one or more in-memory data structures 622-1, 622-2, . . . , for target data 610 associated with the database 410. The in-memory data structures 622-1, 622-2, . . . , are stored in a memory 620, such as a system main memory of the DBMS 420. The in-memory data structures 622-1, 622-2, . . . , collectively or individually referred to as in-memory data structures 622 or data structures 622. Although one memory device is depicted, in some embodiments, the DBMS 420 may be equipped with more than one memory. With the in-memory data structure(s) created, the DBMS 420 further includes an in-memory access service 630 to support access to the in-memory data structures in the memory 620.

The DBMS 420 identifies target data 610 that are eligible for an in-memory data structure(s). Herein, the target data 610 being "associated with" the database 410 means that the target data 610 may be stored in the database 410, as illustrated in FIG. 6, or may be intermediate data generated during execution of queries against the database 410, which is not stored into the database 410. The target data 610 in the latter case is not illustrated in FIG. 6.

In the case that the target data 610 is stored in the database 410, a whole database table stored in the database 410 or a part of the database table may be identified as the target data. It is noted that although "database table" or "table" is used herein, this term may also be referred to as a database file, directory, data volume, data block, extent, or any other hierarchies or organizations of data addressable from a database.

In the case that the target data 610 is the intermediate data, the target data 610 may be determined as a part or an entirety of a resulting database table of an operation executed on at least one database table stored in the database 410. As an example, the target data 610 may be a resulting database table after performing operations, such as sorting, grouping, and/or the like, on one specific table stored in the database 410, or may be a part of the resulting database table. As another example, the target data may be a part or an entirety of a resulting database table after joining two or more database tables stored in the database 410. Such resulting database table may be temporally obtained for use during execution of the queries but may not be stored into the database 410.

Since the storage space in a memory is generally limited, it may be impractical to build in-memory data structures in the memory for a very large size of data. Therefore, in some embodiments, the selection of the target data 610 may follow some criteria.

Specifically, in some embodiments, the DBMS 420 may select the data that is frequently accessed in execution of queries, as the target data 610. In general, a database table or a part thereof is accessed if it is referenced in a query. Thus, in order to determine the target data 610, the DBMS 420 may analyze historical queries against the database 410, for example, all the queries that are received for a period of time. By analyzing the historical queries, the DBMS 420 may determine historical access frequencies of database tables or their specific parts. If the historical access frequency of certain data (a table or partial data in the table) is relatively high, for example, higher than an access frequency threshold, the data may be identified as the target data 610. The access frequency threshold may be predetermined and may be varied depending on the actual applications.

Alternatively, or in addition to the access frequency, for the data stored in the database 410, the DBMS 420 may select data that are seldom modified as the target data 610 in order to avoid the in-memory data structure(s) to be updated frequently to keep synchronization. A database table stored in the database 410 is modified through queries which request for inserting data into the table, updating data already stored the table, and/or deleting data from the table. Accordingly, the DBMS 420 may determine historical update frequencies of database tables or their specific parts by similarly analyzing the historical queries.

If the historical update frequency of certain data (a table or partial data in the table) is relatively low, for example, lower than an update frequency threshold, the data may be identified as the target data 610. The update frequency threshold may be predetermined and may be varied depending on the actual applications. In some embodiments, if one or more read-only database tables are found in the database 410, the DBMS 420 may select those database tables as the target data 610.

In some embodiments, the size of the target data 610 may not be too large considering the limited storage space of the memory 620. The DBMS 420 may set a size threshold and select target data with a size lower than the size threshold.

The selection criteria based on the historical access frequency, historical update frequency, and/or the size has been described above. Those criteria can be applied separately or in combination. For example, data that satisfy all the three criteria or any two of the criteria can be determined as the target data 610. It would be appreciated that any other criteria may also be applied for identifying the target data 610.

For the purpose of better illustration, some example queries are provided below to show how different target data can be determined in different cases. One skilled in the art understands the statements included in queries such as in SQL queries. For example, predicates are used in the search condition of "WHERE" clauses, the join conditions of "FROM" clauses, and the like. A "WHERE" clause in SQL specifies that a SQL Data Manipulation Language (DML) statement affect rows that meet specified criteria. The criteria are expressed in the form of predicates. "WHERE" clauses can be used to limit the number of rows affected by a SQL DML statement or returned by a query. In brief, the "WHERE" clause is used to extract only those results from a SQL statement with operators such as "SELECT," "INSERT," "UNION," "UPDATE," or "DELETE". A "FROM" clause specifies that related database tables referencing in queries. Other clauses include aggregation operators such as "GROUP BY," "AVG," "MAX," "MIN," and the like. As the SQL queries are well known, the following example SQL queries will not be interpreted in detail.

In a first example, an SQL query (represented as "SQL #1") is as follows:

```
SQL#1:
SELECT A.C3, B.C3
FROM TAB_1 AS A,
    TAB_2 AS B
WHERE A.C1 = B.C1
    AND B.C2 BETWEEN 10 AND 20
```

In this example, the database tables "TAB_1," "TAB_2" stored in the database, more specifically, some columns of the two tables are referenced in the query "SQL #1." Depending on the historical access frequencies, the historical update frequencies, and/or the sizes of the whole database tables "TAB_1," "TAB_2" or their referenced columns, one or both of the tables "TAB_1," "TAB_2," their referenced columns (such as columns "C1," "C2," "C3" of the database table "TAB_2"), or some data items in one or more of the columns (such as data items between 10 and 20 in the column "C2" of the database table "TAB_2") may be determined as the target data.

In some examples, a part of a database table selected to be the target data may be determined from several different parts of the database table referenced in multiple historical queries. As an example, in addition to the above query "SQL #1," the column "C2" of the database table "TAB_2" is also referenced in the following queries "SQL #2" and "SQL #3":

```
SQL#2:
SELECT A.C3, B.C3
FROM TAB_3 AS C,
    TAB_2 AS B
WHERE A.C1 = B.C1
    AND B.C2 <= 15
SQL#3:
SELECT B.C3
FROM TAB_2 AS B
WHERE B.C2 >= 5
```

Figure 7:
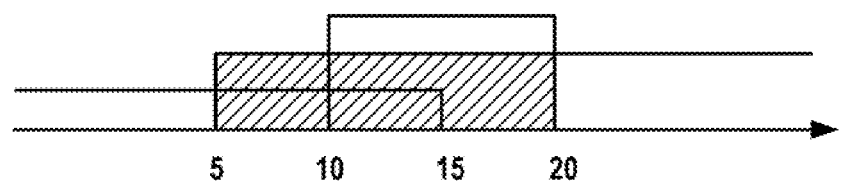
FIG. 7 schematically depicts an example of different ranges of data items, in accordance with some embodiments of the present disclosure.

In the above examples, a value range smaller than or equal to 15 in column "C2" of the database table "TAB_2" is accessed in execution of the query "SQL #2" and a value range larger than or equal to 5 in column "C2" of the database table "TAB_2" is accessed in execution of the query "SQL #3". FIG. 7 schematically illustrates those ranges in a coordinate axis.

By analyzing the historical queries against the database 410, the DBMS 420 finds that a range between 5 and 20 in the column "C2" of the database table "TAB_2" are more frequently accessed. Thus, the DBMS 420 determines the target data to include data items in the column "C2" of the database table "TAB_2" within a value range between 5 and 20 even though this range may not be explicitly specified in historical queries. Of course, the target data may probably include data items in other columns of the table indexed by the selected data items in column "C2."

In some examples, as mentioned above, the target data 610 may be intermediate data generated based on data stored in the database 410 during execution of queries. Two example queries "SQL #4" and "SQL #5" are provided below.

```
SQL#4:
SELECT A.C3, B.C3, C.C3
FROM TAB_1 AS A,
    TAB_2 AS B,
    TAB_3 AS C
WHERE A.C1 = B.C1
    AND B.C2 = C.C2
    AND B.C2 BETWEEN 10 AND 20
SQL#5:
SELECT SUM(B.C5), COUNT(*)
FROM TAB_2 AS B
WHERE B.C2 BETWEEN 10 AND 20
GROUP BY B.C1, B.C2, B.C3
```

In the above example query "SQL #4," the target data may be a resulting database table of the database table "TAB_2" joining with the database table "TAB_3" with or without any certain predicates if the resulting database table meets one or more criteria for identifying the target data as discussed above. In the above example query "SQL #5," the target data may be a resulting database of the database table "TAB_2" grouped by the columns "C1," "C2," and "C3."

It would be appreciated that those above queries are provided as specific examples for illustrative purpose, without suggesting any limitations to the present disclosure.

With the target data 610 identified, the DBMS 420 determines one or more data structures 622 for the target data 610 based on a plurality of historical queries against the database 410, and implements the one or more data structures 622 in the memory 620 to store the target data 610. The one or more data structures 622, also referred to as in-memory data structures 622, can be used for further access of the target data 610 in execution of a further query against the database 410.

Unlike the general historical queries against the database 410 considered in determining the target data 610 as described above, the plurality of historical queries used for determining the data structures(s) 622 are those actually referencing the target data 610. Thus, the target data 610 were partially or entirely accessed in execution of each of the plurality of historical queries.

As used herein, a "data structure" is a specialized format for organizing, processing, retrieving and storing data so that operations can be performed on the stored data more efficiently. Some basic data structures that can be used commonly used data structures includes, but are not limited to, arrays, stacks, queues, linked lists, trees, graphs, tries, and hash tables. There are also some advanced data structures defined based on the above basic data structures. Some specific data structures will be described as examples in the following for the purpose of better illustration. However, it would be appreciated that any data structure, which is designed to organize data so that it can be accessed and used in an efficient way, can be similarly utilized.

Different data structures have different efficiency levels in different of access patterns for accessing data. In embodiments of the present disclosure, from the historical queries, the DBMS 420 can explore one or more access patterns of the target data 610 (referred to as "access patterns" of the target data 610) in execution of the historical queries against the database 410. The access pattern(s) of the target data 610 may indicate how the target data 610 is accessed and thus can be used to assist in determining which in-memory data structure(s) 622 is suitable for more efficient access to the target data 610.

In some embodiments, the one or more access patterns of the target data 610 may be determined by analyzing one or more respective statements related to the target data 610 in the historical queries as the statements can at least partially determine how the target data 610 is accessed.

The DBMS 420 may search for the statements that may influence how the target data 610 is accessed. Such statements may be defined with an equals sign ("="), a keyword "BETWEEN," or their equivalents, which are generally used in the search condition of the queries. Other statements may be defined with one or more SQL operators, such as "SELECT," "UNION," "DELETE," or "UPDATE," though this list is not exhaustive and many other additional operators are well known to those of skill in the art.

In some embodiments, one or more respective access plans created for execution of the historical queries may be analyzed in order to determine the access pattern(s). An access plan of a query, also referred to as "access path," defines specific implementations of data access for executing a query, which is generally created by a query optimizer (not shown in the figures) for the query execution. An access plan may indicate, among others, a join order for two or more database tables being joined in a query, a join method, and an access method. Typically, there may be various join orders, various join methods (such as a nest loop join, a merge join, and a hash join), and various access methods (such as full table scan, index access, and table access by row identifier). It is noted that the implementation of the query optimizer is also well known to those of skill in the art and thus is not described herein in order to avoid obscuring the present subject matter.

Depending on configuration of the query optimizer and the system, different access plans may be generated for a same query. For the historical queries used in determining the data structure(s) 622, their access plans that were executed in the past, may be recorded for use. By analyzing the access plans, it is possible to determine more specific implementations of historical access to the target data 610, as compared with the statements of the historical queries. Thus, an in-memory data structure that is more suitable for such kind of access may be determined for the target data 610.

As mentioned above, different data structures have different efficiency levels in different of access patterns for accessing data. Based on the one or more access patterns of the target data 610, the DBMS 420 may determine one or more corresponding data structures 622 for the target data 610. There may be a plurality of data structures selectable for the target data 610.

In some embodiments, if an access pattern of the target data 610 indicates that individual data items of the target data 610 are separately accessed, the DBMS 420 may select a data structure that is suitable for separately accessing of the target data 610 by indexing individual data items of the target data 610. In some examples, a hash table may be selected to store the target data 610 in the memory 620 since the hash table is more efficient for indexing individual data items. As used herein, a hash table, or a hash map, stores a collection of data items in an associative array that maps hash keys to values. The values (corresponding to the data items of the target data 610) can be quickly indexed by the hash keys.

Alternatively, or in addition, if an access pattern of the target data 610 indicates that data items of the target data 610 within a range are collectively accessed, the DBMS 420 may select a data structure that is suitable for collectively accessing of the target data 610 by indexing the range of data items. In some examples, a linked list, such as a leap linked list, may be selected for the target data. A linked list is a format of dynamic data structure that uses pointers to "chain" data items of the list together. In a leap linked list, each element, or node in the linked list contains a data item as well as a reference, or link, to the next item in the list. The leap linked list provides high efficiency in searching for a range of data items from a collection of data items.

Alternatively, or in addition, if an access pattern of the target data 610 indicates that data items of the target data are accessed and sorted, the DBMS 420 may select a data structure that is suitable for sorting of the target data 610, for example, by indexing ordered data items of the target data 610. In some examples, a multi-dimensional linked list may be selected for the target data 610. In a multi-dimensional linked list, data items are organized in different dimensions, and the orders of the data items in respective dimensions are explicitly indicated. Thus, as compared with the leap linked list, the multi-dimensional linked list can provide higher efficiency in accessing and returning sorted data items.

It would be appreciated that although some specific examples of data structures (such as the hash table, the leap linked list, or the multi-dimensional linked list) are described above, other data structures may also be selected. In some embodiments, if a plurality of access patterns of the target data 610 are observed from the historical queries, the dominant access pattern (for example, the one that occurs more frequently) may be used to determine one data structure for the target data 610, or more than one access pattern may be used to determine one or more different data structures. The scope of the present disclosure is not limited in this regard.

To better illustrate the in-memory data structure(s) 622 for the target data 610, some specific examples are provided below. In a first example, the query may be the above SQL query represented as "SQL #1," which is repeated here for convenience:

```
SQL#1:
SELECT A.C3, B.C3
FROM TAB_1 AS A,
     TAB_2 AS B
WHERE A.C1 = B.C1
      AND B.C2 BETWEEN 10 AND 20
```

To execute the above example query "SQL #1," various access plan with respect to the database tables "TAB_1" and "TAB_2" are possible. An example access plan that was created for the above example query "SQL #1" is as follows:

```
ACCESS PLAN#1:
Join order: TAB_1 → TAB_2;
Join method: nest loop join;
Access method: "index access" against TAB_2
```

It is assumed that the database table "TAB_2" is the target data. According to the statements in the example query "SQL #1" and the corresponding access plan "ACCESS PLAN #1," this query was executed by the following execution steps: the database table "TAB_1" is the first table to be accessed to join with "TAB_2" (as defined by the join order), and thus data items in the column "C1" of the database table "TAB_1" are read from the database; the obtained data items in the table "TAB_1" are then used as indices to search for individual data items in the column "C1" of the database table "TAB_2" from the database (as defined by the join method, the access method, and the condition "A.C1=B.C1" in the query); and so on.

Accordingly, during execution of the query "SQL #1," individual data items meeting the condition in the column "C1" of the database table "TAB_2" are accessed from the database. In such case, the DBMS 420 may select an in-memory data structure that is suitable for indexing individual data items for the database table "TAB_2," for example, a hash table.

In implementing the hash table in the memory for the database table "TAB_2," respective data items in the column "C1" of the database table "TAB_2" may be used as hash keys to index respective entries (or rows) in this table. In some embodiments, a part of the database table "TAB_2," such as columns "C1," "C2," and "C3," are the target data because the three columns are referenced in this query (and may of course be frequently referenced in other similar queries). In such case, the respective data items in the column "C1" of the database table "TAB_2" may be used as hash keys to index corresponding data items in the three columns "C1," "C2," and "C3" of the database table "TAB_2."

As mentioned above, different statements of the historical queries and different access plans may exhibit different access patterns, which may lead to different in-memory data structures. As another example, for the same query "SQL #1" in the above, the access plan may be different, as follows:

```
ACCESS PLAN#2:
Join order: TAB_2 → TAB_1;
Join method: nest loop join;
Access method: "index access" against TAB_2
```

It is still assumed that the database table "TAB_2" is the target data. As compared with the access plan "ACCESS PLAN #1," the join order is different in the access plan "ACCESS PLAN #2." According to the statements in the example query "SQL #1" and the corresponding access plan "ACCESS PLAN #2," this query was executed by the following execution steps: the database table "TAB_2" is the first table to be accessed to join with "TAB_1" (as defined by the join order), and thus data items in the column "C2" of the database table "TAB_2" meeting the condition of a range "between 10 and 20" are read from the database; and so on.

Accordingly, during execution of the query "SQL #1," data items of the target data within a range are accessed from the database. In such case, the DBMS 420 may select an in-memory data structure that is suitable for indexing a range of data items. The hash table may not be the best choice. In some embodiments, the DBMS 420 may determine to create a leap linked list for the target data (the database table "TAB_2" in this example).

Figure 8A:
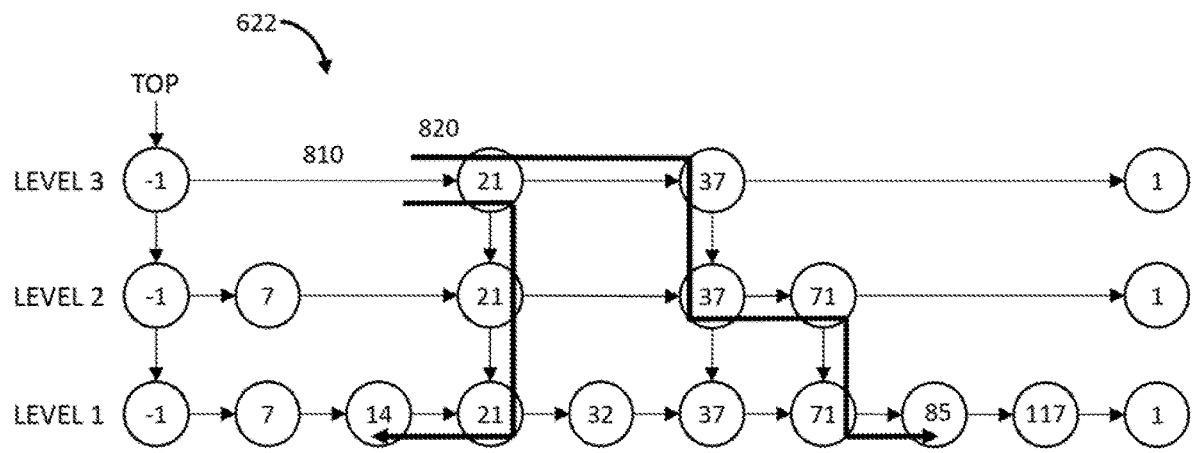
FIGS. 8A-8B depict examples of an in-memory data structure, in accordance with some embodiments of the present disclosure.

FIG. 8A illustrates an example data structure 622 in the format of the leap linked list. In this example, only data items in the column "C2" of the database table "TAB_2," which are all numerical values, are shown in the leap linked list. The leap linked list has a multi-level structure, each level comprising a plurality of nodes indicating data items. The nodes at the same level are linked from one to another, and the corresponding nodes at different levels are also linked. The number of the data items is increased from the top level to the bottom level (from Level3 to Level1 in the shown example), and the data items in each level are sorted. The bottom level includes nodes corresponding to all the data items in the column.

As a specific example, if it is expected to localize a value range between 14 and 117, only two paths 810, 820 from the top level to the bottom level are performed to localize the start point "14" and the end point "117" in that value range. In each of the paths 810, 820, only several times of comparison are needed. Therefore, with the use of the leap linked list, the value range can be efficiently localized from all the data items. In some cases, the leap linked list may include data items in other columns of the database table "TAB_2" if the whole table is identified as the target data. In some other cases, the leap linked list may include data items in the column "C2" of the database table "TAB_2" or data items within a certain range if it is found that this column or the range of data items is frequently accessed in execution of other historical queries and can be determined as the target data.

In some embodiments, in addition to the join order, the join methods and the access methods in the access plans may also impact on the selection of the in-memory data structure. To better illustrate this point, a further example SQL query (represented as "SQL #6") is as follows:

```
SQL#6:
SELECT A.C3, B.C3
FROM TAB_1 AS A,
     TAB_2 AS B
WHERE A.C1 = B.C1
     AND B.C2 BETWEEN 10 AND 20
ORDER BY B.C1
```

An example access plan that was created for the above example query "SQL #6" is as follows:

```
ACCESS PLAN#3:
Join order: TAB_1 → TAB_2;
Join method: sort merge join;
Access method: "table scan" against TAB_2
```

It is assumed that the database table "TAB_2" is the target data. The join method in the access plan "ACCESS PLAN #2" is a sort merge join and the access method is "table scan," which requires data items in the columns of the data tables are sorted before joining together. Thus, in such case, the DBMS 420 may select an in-memory data structure that is suitable for accessing sorted data items, such as a multi-dimensional linked list.

Figure 8B:
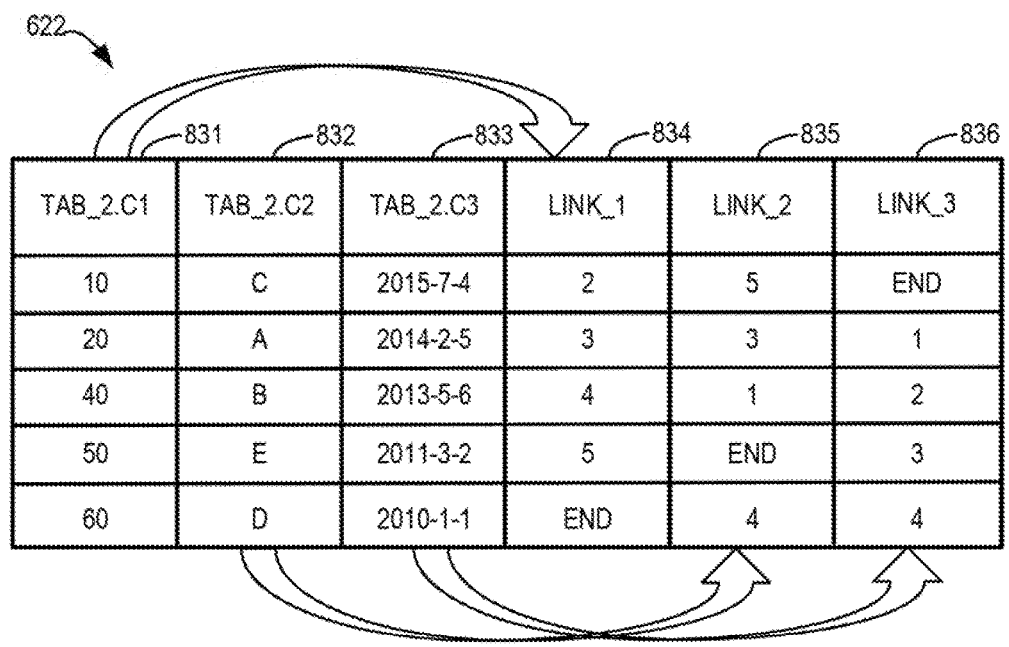

FIG. 8B illustrates an example data structure 622 in the format of the multi-dimensional linked list. As shown, different data dimensions 831, 832, 833 in the data structure 622 stores data items in the columns "C1," "C2," and "C3" of the database table "TAB_2," each dimension being linked to one of link dimensions 834, 835, 836, as shown using the arrows. The link dimensions 834, 835, 836 indicate the sorting of the data items in the linked data dimensions 831, 832, 833. A numerical value in the link dimensions 834, 835, 836 indicates the position (the row) of the data item next to the corresponding data item in the linked data dimension.

In the shown example, it is assumed that the data items are sorted in an ascending order. In the link dimension 834, the first data item "2" indicates that a data item next to the corresponding data item "10" of the linked data dimension 831 in the same row is placed in the second row (supposed that the header row is omitted), i.e., the data item of "20". Similarly, in the link dimension 836, the first data item "5" indicates that a data item next to the corresponding data item "C" of the linked data dimension 832 in the same row is placed in the fifth row (supposed that the header row is omitted), i.e., the data item of "D". The sorting of other data items in the columns can be similarly determined according to the multi-dimensional linked list.

It is noted that although one example query is presented above, the DBMS 420 may make the decision to implement the corresponding in-memory data structures after observing the corresponding access patterns of the target data in execution of multiple queries. Although only the target data stored in the database are mentioned in the above examples, for the intermediate data that is generated during execution of the historical queries, their in-memory data structures can be similarly determined from their access patterns in execution of the historical queries. It would be appreciated that the example structures shown in FIGS. 8A-8B are merely for the purpose of illustration, and other structures of linked lists are also applicable.

After one or more in-memory data structures 622 are implemented in the memory 620 to store the target data, the DBMS 420 can access the target data or a part thereof from the one or more in-memory data structures 622 through in-memory access, without performing the database access which consumes more processor resources.

More specifically, if the DBMS 420 receives a further query which references the target data 610 or a part of the target data 610, it may access the query by accessing the referenced target data or the part of the target data 610 from the in-memory data structure(s) 622. The access to the data structure(s) 622 may be performed by the in-memory access service 630. The query optimizer, when generating an access plan for the current query, may take the in-memory data structure(s) 622 into account. If more than one data structure 622 is stored in the memory 620, the one that matches with an access pattern of the target data (or a part thereof) in the current query may be accessed by the DBMS 420.

In some embodiments, if the current query references to other data or another part of the target data that is not stored in the in-memory data structure(s) 622, the DBMS 420 may initiate the database access 424 to access those data in order to complete the execution of the current query. For example, if the current query references to a certain range of data items of the target data 610, but only a part of the range is stored in an in-memory data structure 622, the DBMS 420 may revoke the in-memory access service 630 to obtained the part of the range from the in-memory data structure 622, and revoke the database access service 424 to the remaining part of the referenced range stored in the database 410. The access efficiency is improved and the resource consumption is reduced as compared with accessing all the data items in the referenced range.

As the in-memory data structure(s) 622 serves as a cached version of the target data 610 in order to support fast access, it is important that the in-memory data structure(s) 622 are in synchronization with the stored target data 610 in the database 410 or the intermediate target data 610 generating from other data stored in the database 410. Therefore, the DBMS 420 may update the in-memory data structure(s) 622 if it is detected that the target data 610 is modified, in order to make sure correct access to the latest target data 610. The modification to data stored in the database 410 may include inserting data into a table, updating data already stored in a table, and/or deleting data from a table. Such modification may also be initiated by issuing queries to the DBMS 420, such as SQL queries including operators of "INSERT," "UPDATE," and/or "DELETE."

In some embodiments, if the target data 610 is stored in the database 410 and is to be modified, the DBMS 420 may modify the in-memory data structure(s) 622 to store the modified target data 610. Since the access speed to the memory 620 is generally faster than the access speed to the database 410, the DBMS 420 may perform the query to modify the target data 610 to the database 410 first. After the modification transaction is committed to the database 410, which means that the target data 610 is modified, the DBMS 420 turns to modify the in-memory data structure(s) 622 accordingly. In some embodiments, if an in-memory data structure 622 stores a part of a database table and the modification to the database table does not require modifying that part, the DBMS 420 may not need to modify this in-memory data structure 622.

In some embodiments, if the target data 610 is generated from further data stored in the database 410 and the further data is to be modified, the DBMS 420 may also modify the in-memory data structure(s) 622 to store modified target data generated from the modified further data. For example, if the target data 610 is a resulting database table generated from two database tables stored in the database 410, and any one of the two stored database tables are modified, the DBMS 420 may modify the in-memory data structure(s) 622 accordingly. Similarly, considering the faster access speed of the memory 620, the DBMS 420 may first modify the data stored in the database 410. The DBMS 420 may further generate the modified target data based on the modified stored data and store the modified target data into the in-memory data structure(s) 622.

Figure 9:
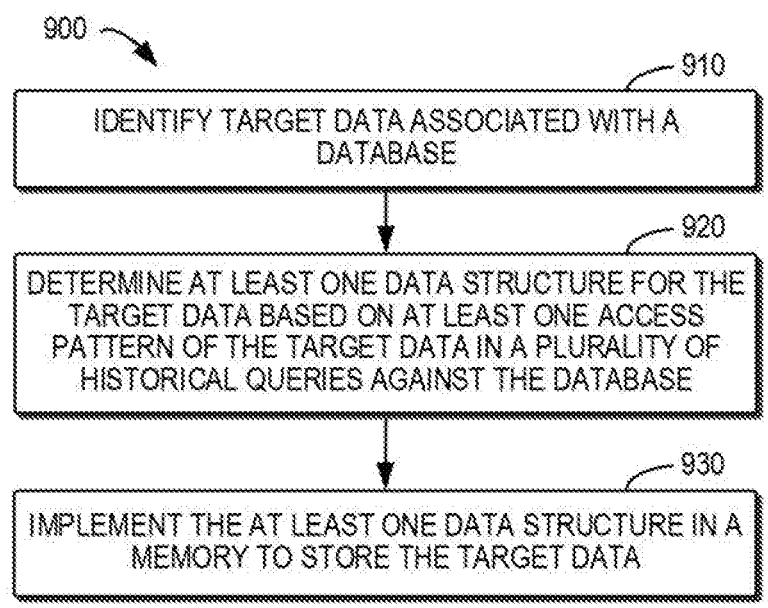
FIG. 9 depicts a flowchart of an example process, in accordance with some embodiments of the present disclosure.

FIG. 9 shows a flowchart of an example method 900 according to some embodiments of the present disclosure.

The method 900 can be implemented at the database management system 420 of FIG. 6. For the purpose of discussion, the method 900 will be described from the perspective of the database management system 420 with reference to FIG. 6.

At block 910, the database management system 420 identifies target data associated with a database. At block 920, the database management system 420 determines at least one data structure for the target data based on at least one access pattern of the target data in a plurality of historical queries against the database. The target data are accessed in execution of the plurality of historical queries. At block 930, the database management system 420 implements the at least one data structure in a memory to store the target data, for further access to the target data in execution of a further query against the database.

In some embodiments, the target data comprises one of the following: a database table stored in the database, a part of the database table stored in the database, a resulting database table of an operation executed on at least one database table stored in the database, or a part of the resulting database table.

In some embodiments, determining the target data comprises: selecting the target data in accordance with a determination that at least one of the following conditions is satisfied: a historical access frequency of the target data exceeding an access frequency threshold, a historical update frequency of the target data in the database being below an update frequency threshold, or a size of the target data being below a size threshold.

In some embodiments, the method 900 further comprises determining the at least one access pattern based on at least one of the following: respective statements related to the target data in the plurality of historical queries, and respective access plans created for the execution of the plurality of historical queries.

In some embodiments, determining at least one data structure comprises performing at least one of the following: in accordance with a first access pattern of the at least one access pattern indicates that individual data items of the target data are separately accessed, selecting, from a plurality of candidate data structures, a first data structure which is suitable for separately accessing of the target data; in accordance with a second access pattern of the at least one access pattern indicates that data items of the target data within a range are collectively accessed, selecting, from the plurality of candidate data structures, a second data structure which is suitable for collectively accessing of the target data; and in accordance with a third access pattern of the at least one access pattern indicates that data items of the target data are accessed and sorted, selecting, from the plurality of candidate data structures, a third data structure which is suitable for sorting of the target data.

In some embodiments, the first data structure comprises a hash table, the second data structure comprises a leap linked list, and the third data structure comprises a multi-dimensional linked list.

In some embodiments, the method 900 further comprises in accordance with a determination that the target data is stored in the database and is to be modified, after the target data stored in the database is modified, modifying the at least one data structure to store the modified target data; and in accordance with a determination that the target data is generated from further data stored in the database and the further data is to be modified, after the further data is modified, modifying the at least one data structure to store modified target data generated from the modified further data.

In some embodiments, the method 900 further comprises in accordance with a determination that the further query references at least a part of the target data, executing the further query by accessing at least the part of the target data from the at least one data structure.

It should be noted that the database query management or the database management system 420 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by one or more processors, target data associated with a database;
   determining, by the one or more processors, at least one data structure for the target data based on at least one access pattern of the target data in a plurality of historical queries against the database, wherein the target data is accessed in execution of the plurality of historical queries,
   wherein determining the target data comprises:
   selecting, by the one or more processors, data that is infrequently modified as the target data in order to avoid the at least one data structure to be updated frequently to keep synchronization;
   determining, by the one or more processors, the at least one access pattern based on at least one of the following:
     one or more respective statements related to the target data in the plurality of historical queries; and
     one or more respective access plans created for the execution of the plurality of historical queries, wherein the one or more respective access plans indicate, among others, a join order for two or more database tables being joined in a query, a join method, and an access method;
   analyzing the one or more respective access plans to determine a more specific implementation of historical access to the target data, as compared with the one or more respective statements of the plurality of historical queries;
   selecting, by the one or more processors, the target data in accordance with a determination that at least one of the following conditions is satisfied:
     a historical access frequency of the target data exceeding an access frequency threshold;
     a historical update frequency of the target data in the database being below an update frequency threshold; or
     a size of the target data being below a size threshold;
   implementing, by the one or more processors, the at least one data structure in a memory to store the target data, for further access to the target data in execution of a further query against the database; and
   in accordance with a determination that the further query references at least a part of the target data, executing, by the one or more processors, the further query by accessing at least the part of the target data from the at least one data structure.

2. The computer-implemented method of claim 1, wherein the target data comprises one of the following:
   a database table stored in the database;
   a part of the database table stored in the database;
   a resulting database table of an operation executed on at least one database table stored in the database; or
   a part of the resulting database table.

3. The computer-implemented method of claim 1, wherein determining the at least one data structure comprises performing at least one of the following:
   in accordance with a first access pattern of the at least one access pattern indicates that individual data items of the target data are separately accessed, selecting, by the one or more processors and from a plurality of candidate data structures, a first data structure which is suitable for separately accessing the target data;
   in accordance with a second access pattern of the at least one access pattern indicates that data items of the target data within a range are collectively accessed, selecting, by the one or more processors and from the plurality of candidate data structures, a second data structure which is suitable for collectively accessing the target data; and
   in accordance with a third access pattern of the at least one access pattern indicates that data items of the target data are accessed and sorted, selecting, by the one or more processors and from the plurality of candidate data structures, a third data structure which is suitable for sorting the target data.

4. The computer-implemented method of claim 3, wherein the first data structure comprises a hash table, the second data structure comprises a leap linked list, and the third data structure comprises a multi-dimensional linked list.

5. The computer-implemented method of claim 1, further comprising:
   in accordance with a determination that the target data is stored in the database and is to be modified;
     after the target data stored in the database is modified, modifying, by the one or more processors, the at least one data structure to store the modified target data; and
   in accordance with a determination that the target data is generated from further data stored in the database and the further data is to be modified,
     after the further data is modified, modifying, by the one or more processors, the at least one data structure to store modified target data generated from the modified further data.

6. A system comprising:
   a processing unit; and
   a memory coupled to the processing unit and storing instructions thereon, the instructions, when executed by the processing unit, performing acts comprising:
     identifying, by one or more processors, target data associated with a database;
     determining, by the one or more processors, at least one data structure for the target data based on at least one access pattern of the target data in a plurality of historical queries against the database, wherein the target data is accessed in execution of the plurality of historical queries, wherein determining the target data comprises:
       selecting, by the one or more processors, data that is infrequently modified as the target data in order to avoid the at least one data structure to be updated frequently to keep synchronization;

determining, by the one or more processors, the at least one access pattern based on at least one of the following:

one or more respective statements related to the target data in the plurality of historical queries; and one or more respective access plans created for the execution of the plurality of historical queries, wherein the one or more respective access plans indicate, among others, a join order for two or more database tables being joined in a query, a join method, and an access method;

analyzing the one or more respective access plans to determine a more specific implementation of historical access to the target data, as compared with the one or more respective statements of the plurality of historical queries;

selecting, by the one or more processors, the target data in accordance with a determination that at least one of the following conditions is satisfied:

a historical access frequency of the target data exceeding an access frequency threshold;

a historical update frequency of the target data in the database being below an update frequency threshold; or a size of the target data being below a size threshold;

implementing, by the one or more processors, the at least one data structure in a memory to store the target data, for further access to the target data in execution of a further query against the database; and in accordance with a determination that the further query references at least a part of the target data, executing, by the one or more processors, the further query by accessing at least the part of the target data from the at least one data structure.

7. The system of claim 6, wherein the target data comprises one of the following:

a database table stored in the database;

a part of the database table stored in the database;

a resulting database table of an operation executed on at least one database table stored in the database; or a part of the resulting database table.

8. The system of claim 6, wherein determining the at least one data structure comprises performing at least one of the following:

in accordance with a first access pattern of the at least one access pattern indicates that individual data items of the target data are separately accessed, selecting, from a plurality of candidate data structures, a first data structure which is suitable for separately accessing the target data;

in accordance with a second access pattern of the at least one access pattern indicates that data items of the target data within a range are collectively accessed, selecting, from the plurality of candidate data structures, a second data structure which is suitable for collectively accessing the target data; and in accordance with a third access pattern of the at least one access pattern indicates that data items of the target data are accessed and sorted, selecting, from the plurality of candidate data structures, a third data structure which is suitable for sorting the target data.

9. The system of claim 8 wherein the first data structure comprises a hash table, the second data structure comprises a leap linked list, and the third data structure comprises a multi-dimensional linked list.

10. The system of claim 6, wherein the acts further comprise:

in accordance with a determination that the target data is stored in the database and is to be modified;

after the target data stored in the database is modified, modifying the at least one data structure to store the modified target data;

in accordance with a determination that the target data is generated from further data stored in the database and the further data is to be modified; and after the further data is modified, modifying the at least one data structure to store modified target data generated from the modified further data.

11. A computer program product being tangibly stored on a non-transient machine-readable medium and comprising machine-executable instructions, the instructions, when executed on a device, causing the device to perform acts comprising:

identifying, by one or more processors, target data associated with a database;

determining, by the one or more processors, at least one data structure for the target data based on at least one access pattern of the target data in a plurality of historical queries against the database, wherein the target data is accessed in execution of the plurality of historical queries, wherein determining the target data comprises:

selecting, by the one or more processors, data that is infrequently modified as the target data in order to avoid the at least one data structure to be updated frequently to keep synchronization;

determining, by the one or more processors, the at least one access pattern based on at least one of the following:

one or more respective statements related to the target data in the plurality of historical queries; and one or more respective access plans created for the execution of the plurality of historical queries, wherein the one or more respective access plans indicate, among others, a join order for two or more database tables being joined in a query, a join method, and an access method;

analyzing the one or more respective access plans to determine a more specific implementation of historical access to the target data, as compared with the one or more respective statements of the plurality of historical queries;

selecting, by the one or more processors, the target data in accordance with a determination that at least one of the following conditions is satisfied:

a historical access frequency of the target data exceeding an access frequency threshold;

a historical update frequency of the target data in the database being below an update frequency threshold; or a size of the target data being below a size threshold;

implementing, by the one or more processors, the at least one data structure in a memory to store the target data, for further access to the target data in execution of a further query against the database; and in accordance with a determination that the further query references at least a part of the target data, executing, by the one or more processors, the further query by accessing at least the part of the target data from the at least one data structure.

12. The computer program product of claim 11, wherein determining the at least one data structure comprises performing at least one of the following:

in accordance with a first access pattern of the at least one access pattern indicates that individual data items of the target data are separately accessed, selecting, from a plurality of candidate data structures, a first data structure which is suitable for separately accessing the target data;

in accordance with a second access pattern of the at least one access pattern indicates that data items of the target data within a range are collectively accessed, selecting, from the plurality of candidate data structures, a second data structure which is suitable for collectively accessing the target data; and in accordance with a third access pattern of the at least one access pattern indicates that data items of the target data are accessed and sorted, selecting, from the plurality of candidate data structures, a third data structure which is suitable for sorting the target data.

\* \* \* \* \*